United States Patent
Pegrum et al.

(12)
(10) Patent No.: US 6,516,417 B1
(45) Date of Patent: Feb. 4, 2003

(54) VIRTUAL PRIVATE NETWORKS

(75) Inventors: Michael Scott Pegrum, Nepean (CA); Dwight Jamieson, Ottawa (CA); Matthew Yuen, Ottawa (CA)

(73) Assignee: Nortel Networks, Limited, Quebec (CA)

(*) Notice: Subject to any disclaimer, the term of this patent is extended or adjusted under 35 U.S.C. 154(b) by 0 days.

(21) Appl. No.: 09/131,190

(22) Filed: Aug. 7, 1998

(51) Int. Cl.[7] .................................. H04L 9/00
(52) U.S. Cl. ............................................ 713/201
(58) Field of Search .......................... 713/200, 201, 713/202; 709/223, 226, 324; 714/4

(56) References Cited

U.S. PATENT DOCUMENTS

| | | | | |
|---|---|---|---|---|
| 5,517,620 A | * | 5/1996 | Hashimoto et al. | 395/200.15 |
| 5,621,727 A | * | 4/1997 | Vaudreuil | 370/401 |
| 5,623,492 A | * | 4/1997 | Teraslinna | 370/397 |
| 5,706,279 A | * | 1/1998 | Teraslinna | 370/232 |
| 5,812,525 A | * | 9/1998 | Teraslinna | 370/229 |
| 5,867,677 A | * | 2/1999 | Tsukamoto | 395/311 |
| 6,032,118 A | * | 2/2000 | Tello et al. | 705/1 |
| 6,078,586 A | * | 6/2000 | Dugan et al. | 370/395 |
| 6,081,524 A | * | 6/2000 | Chase et al. | 370/389 |
| 6,188,671 B1 | * | 2/2001 | Chase et al. | 370/232 |

* cited by examiner

*Primary Examiner*—Dieu-Minh Le
(74) *Attorney, Agent, or Firm*—John C. Gorecki

(57) ABSTRACT

A system and method of automatically configuring virtual private networks is provided. The virtual private networks disclosed, include multiple routers selectively connectable to the shared network, such that each of the routers is assigned at least one: shared network address, private network address and virtual private network identifier. Each router includes a controller configured to communicate a router configuration message over the shared network to other members of the same virtual private network. The router configuration message informs the other members of the virtual private network the address of the router and what devices are connected to the router.

9 Claims, 1 Drawing Sheet

VIRTUAL PRIVATE NETWORKS

FIELD OF THE INVENTION

The invention relates generally to the field of Internet Protocol (IP) networks and more particularly, to distribution of private network information over shared network infrastructure.

BACKGROUND OF THE INVENTION

With the growing popularity of the Internet and networks in general, there is a trend towards centralized network services and centralized network service providers. To be profitable, however, network service providers need to constantly maintain and if possible enlarge their customer base and their profits. However, leased line services are coming under increased competition causing profit margins to decrease for these providers. Thus, an increased number of providers are trying to attract small and medium sized businesses by providing centralized network management.

There has been difficulty providing this service, however, due to address conflicts, security problems and performance problems. Historical independent network development has resulted in conflicting and overlapping address space between the individual networks and the management networks.

Others have attempted to solve these problems by using encapsulating techniques, such as internet protocol (IP) tunneling, to separate network traffic from unrelated networks. Currently, IP tunnels are point to point links established between routers which are statically configured by a network operator. This method, however, suffers from many of the same problems discussed above. Inter-network security can not be guaranteed in IP tunneling as it relies upon customer premise equipment to be correctly configured. Further, performance can be a problem since routing disturbances caused by one customer may affect the routing performance of another customer's network.

Accordingly there exists the need for a device which allows the implementation of separate virtual private networks over common infrastructure while providing security and sufficient performance to each network.

The need also exists for such a device which employs encapsulation techniques.

The need also exists for such a device which automatically configures the virtual private networks.

The need further exists for such a device which allows for broadcasting private traffic through a shared network.

It is accordingly an object of the present invention to provide a device which allows the implementation of separate virtual private networks over common infrastructure while providing security and sufficient performance to each network.

It is another object of the invention to provide such a device which employs encapsulation techniques.

It is another object of the invention to provide such a device which automatically configures the virtual private networks.

It is another object of the invention to provide such a device which allows for broadcasting private traffic through a shared network.

These and other objects of the invention will become apparent to those skilled in the art from the following description thereof.

SUMMARY OF THE INVENTION

It has now been discovered that these and other objects may be accomplished by the present virtual private networks which enables private communications over a shared network, between at least two private networks. The present invention includes multiple routers selectively connectable to the shared network such that each of the routers is assigned at least one shared network address, at least one private network address and at least one virtual private network identifier. Each router also includes a controller which is configured to communicate a router configuration message over the shared network. The router configuration message includes the shared network address, the private network address and the virtual private network identifier.

In an embodiment, the invention may include multiple routing means, logically connected together across a shared network, for routing communications between the private networks. It also may include determining means, connected to each of the routing means, for determining all members of a particular virtual private network.

In another embodiment, the invention includes a method of automatically configuring virtual private networks over a shared network. The method may include assigning a shared network address and a virtual private network identifier to a router which is connected to the shared network. It may also include assigning another shared network address and the same virtual private network identifier to another router connected to the same shared network. It may include determining configuration information about the first router such that the configuration information includes the shared network address and the virtual private network identifier of the first router. It may also include communicating the configuration information to the second router.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

The drawing

DETAILED DESCRIPTION OF THE INVENTION

Figure 1:
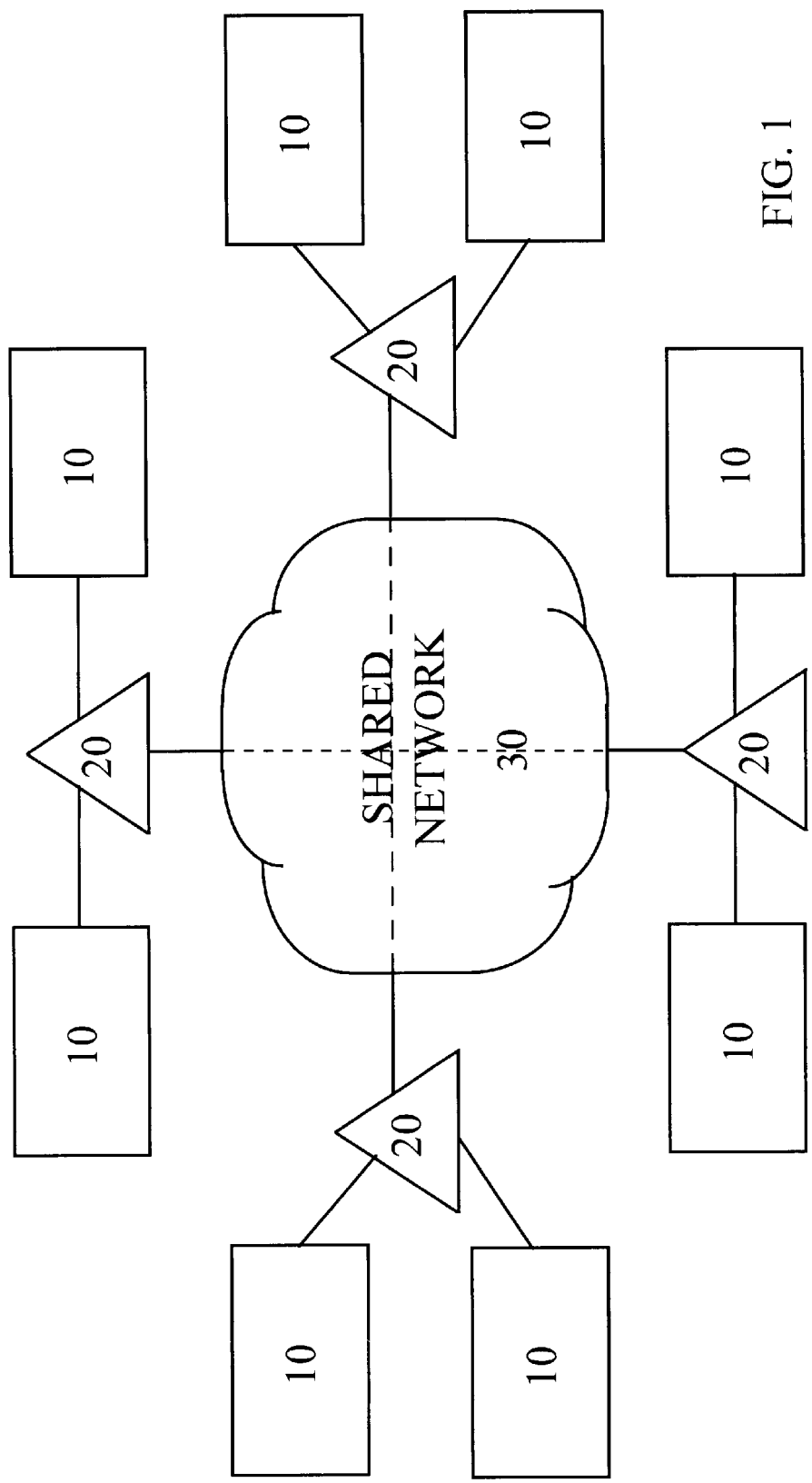
FIG. 1 depicts a block diagram of the preferred embodiment of a virtual private network in accordance with the invention.

A Virtual Private Network (VPN) is a group of individual networks logically connected through one or more shared networks. The present invention enables the automatic formation of VPNs by dynamically distributing VPN information throughout a shared network, thus dynamically forming Internet Protocol (IP) tunnels between VPN routers. Hereinafter, only VPN routers will be referenced; however, those skilled in the art will recognize that other routing devices such as bridges, switches and the like could be employed without departing from the scope of the invention. Further, while only IP tunneling (i.e. GRE in IP or IP in IP) will be referenced, those skilled in the art will recognize that other conventional encapsulation techniques such as Multi-Protocol Label Switching, Asynchronous Transfer Mode, Virtual Circuit Connection protocols etc. and other forms of conventional tunneling can be employed, or communications could be appropriately converted for transmission over different networks (i.e. by bridges etc.).

The drawing illustrates two different VPNs separately connected (as illustrated by the different dashed lines) through a shared network 30 (i.e. such as a third party LAN, an internet, an intranet, a WAN or the like). The number of VPNs depicted in the drawing is strictly for illustrative purposes. It will be apparent to those skilled in the art that one VPN or three or more VPNs may also operate over the same shared network 30. Further, while each VPN has been illustrated as including only two connected networks, it will be apparent that a VPN may also be formed by connecting three or more networks across shared network 30.

Each router 20 connected to the shared network 30 may be identified by a 32 bit VPN identifier (VPNID); a shared network unicast address and optionally a multicast address. Those skilled in the art will recognize that the identifier may be longer or shorter than 32 bits without departing from the scope of the invention. Further, since a single network may be a member of multiple VPNs a particular router 20 may be identified by more than one VPNID. Each router 20, however, belonging to a particular VPN, will share at least one common VPNID. Those skilled in the art will recognize that routers 20 belonging to a common VPN may either share the same VPNID or may have a VPNID which falls within a specified group of VPNIDs. For ease of explanation, both the common VPNID and the group of VPNIDs will only be referred to as the same, the common or the shared VPNID. The shared VPNID may be employed as the destination address in all broadcast tunnel IP headers.

In addition to the VPNID, each router belonging to the same VPN could be identified by an identifier from the private network it belongs to. While it is expected that the private address would reside on the same logical subnet for all private entities belonging to that VPN, a multi-hop approach could also be used.

In a multicast enabled system, each router 20 is assigned a unicast ID and optionally a multicast group ID. The shared network entity may send multicast join messages for each multicast group configured. Once joined each router 20 may execute an ICMP Router Discovery like protocol on that multicast group. While ICMP is disclosed, those skilled in the art will recognize that other conventional protocols may be employed. These router discovery messages are a combination of VPN discovery and address resolution. The VPN discovery is meant to be a security measure to ensure that all routers belonging to this multicast group belong to the same VPN. This is intended to guard against configuration errors. It is assumed that the shared network is secure.

New routers 20 joining a multicast group after it has already been formed issue a VPN ICMP Router Solicitation message to trigger advertisements from other routers 20 on the VPN. This provides configuration feedback to the network operator by allowing the router 20 (i.e. the controller associated with the router) to compare the VPNID advertised with its own. In addition, each router 20 may periodically issue a VPN Router Advertisement Message to ensure that the VPN integrity is maintained. The default period for an Advertisement Messages is every 10 minutes but the network operator can configure the advertisement rate as appropriate for the network.

At this point the routers 20 of a VPN are able to communicate with one another through standard routing protocols. VPN broadcast messages traverse the shared network 30 as a multicast address so that only entities belonging to that VPN receive and process those messages.

For non-multicast enabled systems, the distribution mechanism may be the same as in the multicast enabled system except that the shared destination address may be a broadcast address instead of a multicast group address. A unicast "push" algorithm could "push" unicast copies of a broadcast message through the shared network to each entity on the VPN.

The router 20 may send an unsolicited broadcast of a configuration message that shows the private entity associations 10 on the router 20. The unsolicited broadcast could be triggered by any number of events such as a reconfiguration, powerup, change in status of an entity on the router 20 or it could simply be sent at regular or random time intervals. Since a reconfiguration message is generally unacknowledged, it is generally broadcast to the shared network at time intervals appropriate for the network (this could involve a backoff algorithm for a stable network) to ensure that all nodes receive the VPN information.

It will thus be seen that the invention efficiently attains the objects set forth above, among those made apparent from the preceding description. In particular, the invention provides virtual private networks and methods of dynamically configuring the same. Those skilled in the art will appreciate that the configuration depicted in the drawing discloses a shared network which allows the implementation of separate networks over common infrastructure while providing security and performance to each network.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Virtual private networks which enable private communications over a shared network, between at least two private networks comprising:

a first router, coupled to the shared network;

a second router, coupled to the first router via said shared network;

wherein each of said first and second routers is assigned at least one shared network address, at least one private network address, and at least one virtual private network identifier;

a controller coupled to the first router, the controller configured to periodically communicate a Virtual Private Network (VPN) configuration message over the shared network to the second router, wherein said VPN configuration message includes said at least one shared network address, said at least one private network address and said at least one virtual private network identifier associated with the first router, said VPN configuration message for notifying the second router of a VPN configuration of the at least one of the plurality of routers.

2. The virtual private networks according to claim 1 wherein the second router only processes the VPN configuration message if said virtual private network identifier included therein identifies a virtual private network of which said second router is a member.

3. The virtual private network according to claim 2 wherein said controller is further configured to communicate a router discovery message over the shared network, the router discovery message for identifying other routers on the shared network having a matching virtual private network identifier.

4. The virtual private network according to claim 1 wherein:

communications between said plurality of routers occurs through encapsulated transmissions.

5. A virtual private network which enables private communication over a shared network between at least two actual networks comprising:

a plurality of routing means, logically coupled together across a shared network, for routing communications between said actual networks; and determining means, coupled to each of said plurality of routing means, for determining all members of a virtual private network, said determining means comprising means for periodically soliciting the shared network to identify routing means that share a common virtual private network identifier.

6. The virtual private network according to claim 5 wherein said determining means comprises:

a controller configured to communicate a routing means configuration message to all members of said virtual private network.

7. The virtual private network according to claim 6 wherein said controller is further configured to communicate a routing means discovery message.

8. The virtual private network according to claim 5 wherein:

communications between said plurality of routing means occurs through encapsulated transmissions.

9. A device for establishing a secure connection to another device on a network, the device comprising:

means for automatically periodically signaling the presence of the device on the network, the means including an identifier for identifying each secure connection of which the device is a member; and means for receiving, at the device, signals from other devices coupled to the network, including means for comparing identifiers received from the other devices in the network to identify devices in the network that share common secure connections.

* * * * *